(12) United States Patent
Coutant et al.

(10) Patent No.: US 8,302,863 B2
(45) Date of Patent: Nov. 6, 2012

(54) LIGHTING SYSTEM FOR CONTRASTING ENGRAVED CODES

(75) Inventors: Frederic Coutant, Fontaine le Comte (FR); Guillaume Mazeaud, Saint Sebastien sur Loire (FR); Jean-Baptiste Hubert, Casson (FR)

(73) Assignee: TPL Vision, La Chevroliere (FR)

( * ) Notice: Subject to any disclaimer, the term of this patent is extended or adjusted under 35 U.S.C. 154(b) by 0 days.

(21) Appl. No.: 13/058,908

(22) PCT Filed: Aug. 14, 2009

(86) PCT No.: PCT/FR2009/051591
§ 371 (c)(1),
(2), (4) Date: Mar. 18, 2011

(87) PCT Pub. No.: WO2010/018351
PCT Pub. Date: Feb. 18, 2010

(65) Prior Publication Data
US 2011/0163162 A1    Jul. 7, 2011

(30) Foreign Application Priority Data
Aug. 14, 2008 (FR) ..................... 08 55599

(51) Int. Cl.
*G06K 7/10* (2006.01)
(52) U.S. Cl. .................. 235/455; 235/454; 235/462.42
(58) Field of Classification Search .................. 235/454, 235/455, 462.42
See application file for complete search history.

(56) References Cited

U.S. PATENT DOCUMENTS

| | | |
|---|---|---|
| 4,648,053 A | 3/1987 | Fridge |
| 5,424,536 A | 6/1995 | Moriya |
| 2003/0062413 A1* | 4/2003 | Gardiner et al. .............. 235/454 |
| 2005/0011956 A1* | 1/2005 | Carlson .................... 235/462.42 |
| 2005/0146719 A1 | 7/2005 | Chhibber et al. |
| 2008/0017717 A1 | 1/2008 | Miyazaki et al. |

FOREIGN PATENT DOCUMENTS

| | | |
|---|---|---|
| DE | 37 14 305 A1 | 11/1987 |
| DE | 195 10 257 A1 | 9/1995 |
| JP | A 2005-018391 | 1/2005 |
| JP | A 2007-286793 | 11/2007 |

OTHER PUBLICATIONS

International Preliminary Report on Patentability issued in International Application No. PCT/FR2009/051591 dated Feb. 15, 2011 (with Translation).
Search Report issued in FR 0855599, dated Apr. 2, 2009. (with English-language translation).
International Search Report issued in PCT/FR2009/051591, mailed Feb. 16, 2010. (with English-language translation).

* cited by examiner

*Primary Examiner* — Daniel Hess
(74) *Attorney, Agent, or Firm* — Oliff & Berridge, PLC

(57) ABSTRACT

A lighting device for increasing the contrast of an image of a concave or convex structure provided on a surface, the device including: a first light source arranged so as to emit, according to a first axis of incidence Ii, a first light, the bandwidth of said first light, or "first bandwidth", being less than 100 nm; a second light source arranged so as to emit, according to a second axis of incidence, a second light, the bandwidth of said second light, or "second bandwidth", being less than 100 nm; and a third light source arranged so as to emit, according to a third axis of incidence, a third light, the bandwidth of said third light, or "third bandwidth", being less than 100 nm, the first, second, and third axes of incidence being substantially convergent and the bandwidths of the first, second, and third lights being divergent from each other.

13 Claims, 3 Drawing Sheets

LIGHTING SYSTEM FOR CONTRASTING ENGRAVED CODES

TECHNICAL FIELD

The invention pertains to a lighting device intended to increase the contrast of an image of an engraving produced on a surface, in particular by micropercussion or by laser. The invention also relates to a method for the implementation of such a device as well as to a device for reading engravings produced on a surface comprising such a lighting device.

BACKGROUND OF THE INVENTION

The engraving of dots on the surface of metallic or non-metallic workpieces is conventionally used for coding information, in particular for identification and traceability purposes. These engravings can in particular be produced by means of a laser, generating multiple burns, or by micropercussions executed on the surface to be marked. These technologies make it possible to engrave engravings by producing very small dots, typically of the order of 0.2 mm in diameter. This fineness advantageously enables the engraving on the marked workpiece to be made discreet.

To read engravings, it is known to illuminate the engraved surface by means of a monochrome or white diffuse circular light beam. Such lighting makes it possible to highlight the differences of thickness by illuminating the edges of the holes and bumps on the surface. This solution is effective on a plane and shiny surface and for reading engravings engraved by laser, but is not appropriate if the surface is impaired, that is to say if it is not completely smooth outside of the engraving zones.

It is also known to illuminate the surface by means of a monochrome or white light beam coaxial with the sighting axis, by way of a beam-splitting plate placed in the path of the sighting axis and of the lighting. With this solution, only the rays striking the surface elsewhere than on the engravings are returned toward the eye of the camera, thereby making it possible to reveal the black engraving dots on a white background. This solution, very effective for reading engravings on a plane and shiny surface, is not well suited if the surface is impaired or if it is not plane.

These solutions are also relatively ineffective when the relative position of the engraved surface with respect to the reading device is variable.

The risk of a reading error is further increased when the engraving to be read is produced on surfaces that may exhibit diverse forms (plane, concave or convex) or on surfaces that may exhibit very different surface states or else on surfaces whose nature may be variable.

Finally, the fineness of the engraving dots makes it tricky to read and decipher the engravings.

There therefore exists a requirement for a reading device making it possible to solve, at least partially, the abovementioned problems.

An aim of the invention is to meet this requirement.
1) "Basic" Invention

SUMMARY OF THE INVENTION

The invention proposes a device intended to increase the contrast of an image of an engraving produced on a surface, in particular by micropercussion or by laser, said device comprising:
  a linearly polarized light source able to produce an illumination, measured at 50 mm from said polarized light source, of greater than 100 000 lux, and disposed so as to emit a polarized light along an axis of incidence, and
  a first linear polarizing filter oriented along a sighting axis, the minimum distance between the axis of incidence and the sighting axis being less than 10 mm and the axis of incidence and the sighting axis forming between them an angle $\alpha$ lying between 45 and 65°.

As will be seen in greater detail in the subsequent description, by positioning the engraving in the region of maximum closeness of the sighting axis and axis of incidence, preferably, if appropriate, in proximity to the point of intersection of these axes, a lighting device according to the invention makes it possible, in particular by virtue of its powerful illumination capacity in polarized light, to obtain excellent contrast of the image of the engraving and good homogeneity of this contrast, whether the surface is plane, slightly concave or slightly convex, shiny or matt, even when the dots forming the engraving exhibit a diameter of the order of 0.2 mm and even when the positioning of the engraving with respect to the lighting device is not precise.

Preferably, the lighting device comprises in particular one or more of the following optional characteristics:
  The sighting axis cuts the axis of incidence.
  The first polarizing filter is movable in rotation about the sighting axis.
  The polarized light source is able to produce an illumination, measured at 50 mm from said polarized light source, of greater than 130 000 lux, preferably greater than 150 000 lux, preferably still greater than 180 000 lux.
  Said polarized light is monochromatic and/or focused.
  The span of wavelengths of said polarized light is centered on a passband lying between 600 and 650 nm.
  The lighting device furthermore comprises a diffuse light source disposed so as to be able to illuminate the region where the axis of incidence and the sighting axis are closest to one another.
  The diffuse light source produces, at full power, an illumination, measured at 50 mm from said diffuse light source, of less than 2000 lux.
  The diffuse light source is able to emit a nonpolarized light exhibiting a frequency spectrum substantially identical to that of the polarized light.
  The lighting device furthermore comprises a drive module controlling the operation of the polarized light source and, if appropriate, the operation of the diffuse light source, the drive module being able to modulate the power emitted by the polarized light source and/or the diffuse light source.
  The angle $\alpha$ is less than 60°, preferably less than 55°. An angle $\alpha$ of about 50° is preferred overall.
  Preferably, the minimum distance between the sighting axis and the axis of incidence is less than 10 mm, preferably less than 5 mm, preferably less than 2 mm, more preferably less than 1 mm. In an optimal manner, the axis of incidence cuts the sighting axis.
  The polarized light source can comprise a set of several conventional light-emitting diodes and/or, preferably, one or more light-emitting diodes of high power. Preferably also, the power of this luminous source is greater than 30 lumens, preferably greater than 40 lumens, or indeed greater than 45 lumens. More preferably, the illumination measured at 50 mm from the polarized light source is greater than 180 000 lux. Advantageously, these provisions guarantee the transmission of a large quantity of light to the image capture device.

The total angle of aperture of the light beam emitted by this light source is preferably greater than 90°, preferably greater than 100°, more preferably greater than 110° and/or less than 150°, preferably less than 140°, or indeed less than 130°.

Preferably, the polarized light source comprises a focusing optic making it possible to adjust the total angle of aperture of the light beam emitted. Still preferably, the total angle of aperture is greater than 10°, preferably greater than 12°, more preferably greater than 14° and/or less than 40°, less than 36°, preferably less than 34°. Advantageously, it is thus possible to concentrate the luminous power toward the interior of the engraving dots and to pass through the polarizing filters with limited loss of brightness.

The polarized light is preferably focused, for example by means of a focusing lens. Advantageously, the quantity of polarized light projected onto the engraving is thereby increased. Preferably, the degree of focusing is adjustable.

In one embodiment, the polarized light source emits a monochromatic light. The wavelength of the light can lie between 600 and 650 nm. Preferably, the polarized light is red, blue or infrared.

The first polarizing filter is preferably made of triacetate. More preferably, it exhibits a thickness of less than 200 microns, and, preferably still, of about 150 microns. The first polarizing filter is necessarily linear, a circularly polarizing one being unsuitable.

Preferably, the first polarizing filter is mounted movable in rotation about the sighting axis. Preferably, the maximum amplitude of the rotation of the first polarizing filter around the sighting axis lies between 45° and 85°. The angular position of the first polarizing filter, acting as analyzer of the polarized light reflected by the engraved surface, can therefore be adjusted so as to optimize the contrast.

Preferably, a lighting device according to the invention further comprises a diffuse light source able to illuminate said surface. The diffuse light advantageously makes it possible to increase the quantity of light projected onto the engraved surface and returned to the first polarizing filter. It thus makes it possible to limit the effect of the loss of luminous power resulting from the use of the linear polarizing filters.

The projection of diffuse light is particularly advantageous when the engraved surface is very matt or very shiny.

Preferably, the diffuse light source projects light substantially along the sighting axis V, that is to say illuminates the engraved surface substantially perpendicularly to this surface. This type of lighting is particularly advantageous when the engraved surface is smooth and matt.

Preferably, this diffuse light source comprises one or more light-emitting diodes. The energy developed by this luminous source is preferably less than 6 lumens, preferably less than 4 lumens. Still preferably, the total angle of aperture of the light beam emitted by the diffuse light source is greater than 40°, preferably greater than 45°, more preferably greater than 50° and/or less than 110°, preferably less than 100°, still preferably less than 90°. Preferably, the illumination measured at 50 mm from the diffuse light source is always less than 2000 lux.

Preferably, the diffuse light and the polarized light are substantially of the same nature. However, preferably, the diffuse light is not focused or polarized.

In one embodiment, the lighting device further comprises a drive module able to drive the polarized light source and, if appropriate, the diffuse light source.

The drive of these light sources can in particular be adapted so as to limit the energy consumption, and therefore the heat emitted. In particular, the drive module can activate the polarized light source only at regular intervals.

For a determined engraved surface, the inventors have observed that there exists a power for the polarized light which optimizes the operation of the lighting device according to the invention. By modulating the power of the polarized light, it is however possible to optimize the operation of the lighting device for various engraved surfaces, provided that the optimal powers associated with these surfaces are emitted during said modulation. Preferably, the drive module is therefore able to modulate the power of the polarized light emitted, for example in a sinusoidal manner or in accordance with gating slots.

The drive module can also synchronize the polarized light source and the diffuse light source with respect to one another, for example by ensuring simultaneous or phase-shifted, that is to say shifted in time, on/off cycles of these two sources.

The drive module can in particular be programmed so as to simultaneously activate the polarized light source and the diffuse light source. Advantageously, the operation of the lighting device is substantially improved when the engraved surface is not plane. Furthermore, the simultaneous activation of the two luminous sources improves the operation of the lighting device when the engraving to be illuminated is not disposed precisely in proximity to the region of maximum closeness of the sighting axis and of the axis of incidence.

Preferably, the lighting device is independent of the image capture device and/or of the target carrying the engraved surface. Advantageously, the lighting device can thus be easily replaced or used in various reading devices.

The invention further pertains to a device for reading an engraving made on a surface, said device comprising an image capture device and a lighting device according to the invention which are disposed in such a way that the polarized light emitted by the polarized light source, reflected by said surface and having passed through the first linear polarizing filter, is directed along the axis of an eye of said image capture device.

In a reading device according to the invention, preferably, the wavelength of the polarized light and/or of the diffuse light is suited to the image capture device so as to maximize the quantity of light perceived by the latter having regard to its absorption spectrum. For example, the CCD sensors of cameras generally operate in an optimal manner when the light that they receive is centered on a determined frequency. Preferably, the span of the wavelengths of the polarized light therefore comprises the optimal wavelength for the operation of the image capture device. In one embodiment, this span is substantially centered on this optimal wavelength.

Preferably, the lighting device comprises a drive module for the polarized light source and/or, if appropriate, the diffuse light source, the drive module being able to control the polarized light source and/or the diffuse light source in such a way that it(they) emits(emit) light only when the sensor of the image capture device can be illuminated. In the case where the image capture device is a camera for example, the polarized light source and/or the diffuse light source thus emit, preferably, only when the shutter of the camera does not mask the sensor, that is to say when the camera's eye is open and is "looking".

Preferably, the drive module is able to modulate the power of the polarized light and/or of the diffuse light, and is programmed to modulate said power only when the image capture device is looking, that is to say is able to capture an image.

A reading device according to the invention can in particular take the form of a pistol-grip or triggerless scanner.

The invention also pertains to a method for improving the contrast of an image of an engraving produced on a surface, in which said engraving is presented in front of an entrance aperture of a lighting device according to the invention.

In one embodiment, the polarized light source of said lighting device is monochromatic and the central frequency of the polarized light is chosen as a function of the nature of the surface.

The invention pertains finally to a method for reading an image of an engraving produced on a surface, in which said engraving is presented in front of an entrance aperture of a lighting device of a reading device according to the invention.

In these methods, preferably, said surface is presented substantially perpendicularly to the sighting axis.

Preferably, the angle of incidence β between the axis of incidence and the engraved surface at the point of intersection with the axis of incidence is determined as a function of the form of the engraving dots. Preferably, the angle of incidence β lies between 35° and 55°.

The span of the wavelengths of the polarized light is preferably suited to the material and/or to the texture of the engraved surface, that is to say to the "nature" of this surface. The inventors have indeed noted that for a determined span of wavelengths the effectiveness of the lighting device is variable.

Preferably, the span of the wavelengths of the polarized light is determined as a function of the image capture device and of the nature of the engraved surface so as to optimize the luminous power received by the sensors of the image capture device. Preferably still, the span of the wavelengths of the polarized light is centered on a passband of 430 nm to 490 nm when the surface is made of cast aluminum and/or the span of the wavelengths of the polarized light is centered on a passband of 830 nm to 880 nm when the surface is made of stainless steel.

The methods according to the invention may in particular be implemented to increase the contrast and/or read engravings comprising, or indeed consisting of, dots in relief ("bumps") or sunken ("pits"), whose length and, preferably, width, in the tangent plane to the surface, is (are) less than 1.0 mm, less than 0.5 mm, less than 0.4 mm, less than 0.3 mm, or indeed less than 0.2 mm. The length of a pit is the largest dimension of the aperture of this pit. Its width is the largest dimension of the aperture measured perpendicularly to its length. The length of a bump is the largest dimension of the base of this bump. Its width is the largest dimension of this base measured perpendicularly to its length.

The pits may in particular have been generated by micro-percussion or by laser.

DEFINITIONS

The angle α between two non-secant axes is equal to the angle between two planes normal to these axes.

The term "portable device" is understood to mean a device which may be manipulated and used in the hand. A reading device according to the invention is not necessarily integrated physically into a fixed appliance, in particular because precise positioning of the engraved surface is not required. It may therefore advantageously be rendered portable. Preferably a portable device according to the invention weighs less than 2 kg, less than 1 kg, or indeed less than 500 g. In one embodiment, a portable device comprises a handle, or indeed a single handle.

The term "engraving" is understood to mean a mark engraved on a surface, independently of any information that it might carry. An engraving can in particular consist of a series of alphanumeric characters, for example an identifier, a drawing, a code, or a mark.

The term "monochromatic" is understood to mean light whose color is formed only of one wavelength or, by extension of meaning, of a very narrow band of wavelengths. Typically, this band of wavelengths extends over 50 nm or less.

The term "comprising a" should be understood to mean "comprising at least one", unless indicated otherwise.

BRIEF DESCRIPTION OF THE FIGURES

Other characteristics and advantages of the invention will be further apparent on reading the detailed description which follows and on examining the appended drawing in which FIG. 1 schematically represents a reading device according to the invention, in a service position in which said device performs a reading of an engraving.

Figure 5:
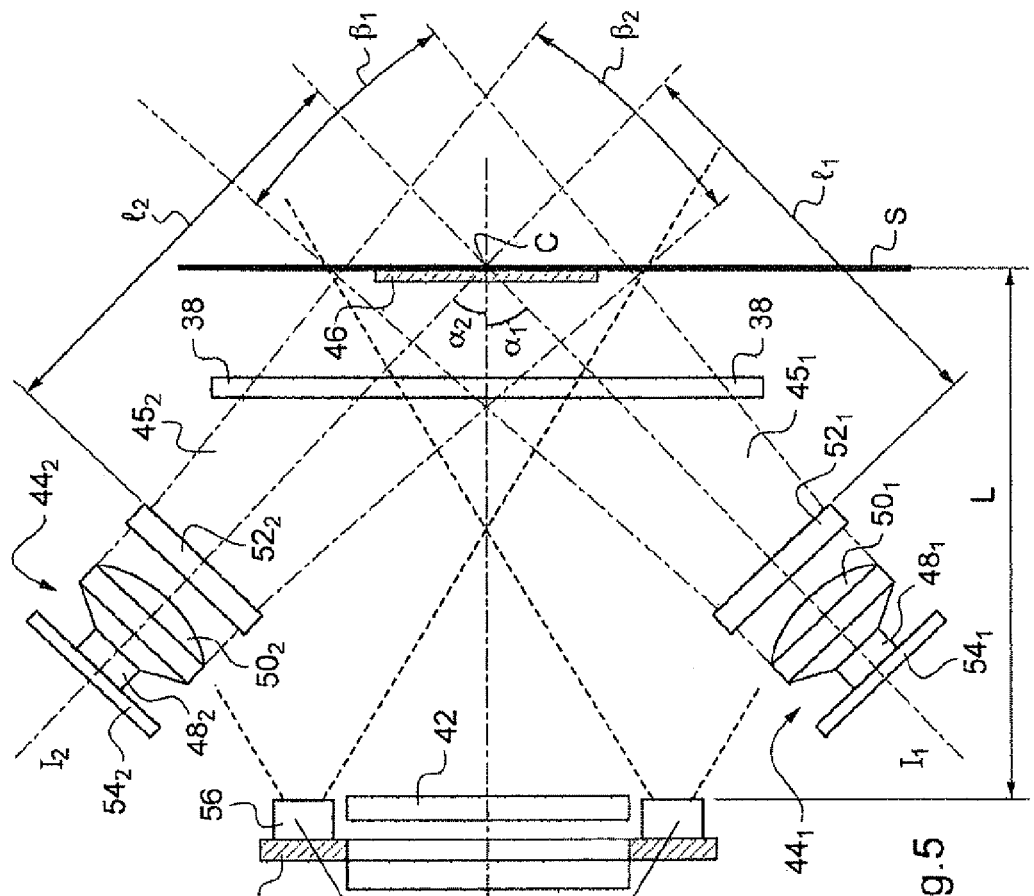
Figure 6:
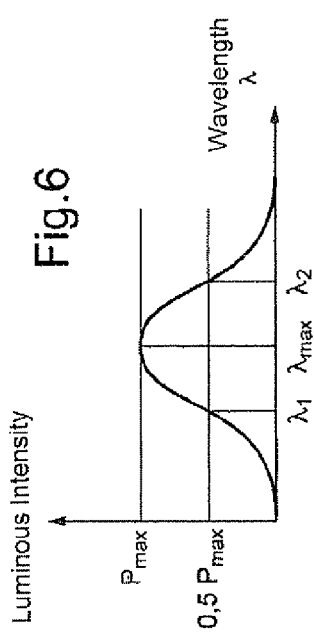
Figure 7:
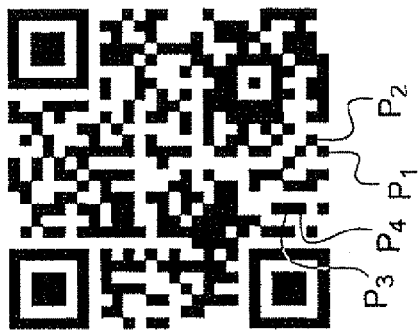

the appended FIG. 5 which schematically represents an "improved" reading device according to the invention, in a service position in which said device performs a reading of an engraving. The embodiment described in detail hereinbelow and represented in FIG. 5 is provided for illustrative and nonlimiting purposes;

FIG. 6 is an example of a luminous spectrum;

FIG. 7 represents an exemplary two-dimensional code that may be read with a basic or improved reading device according to the invention.

The embodiments described and represented are provided for illustrative and nonlimiting purposes.

DETAILED DESCRIPTION OF AN EMBODIMENT

Figure 1:
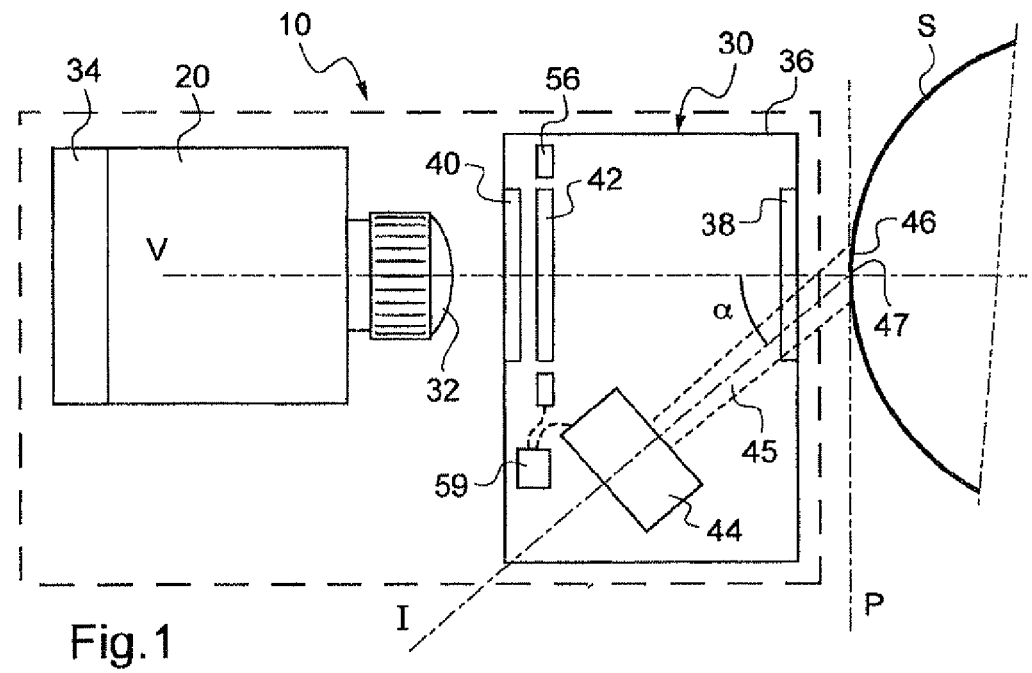

The reading device 10 represented in FIG. 1 comprises an image capture device 20 and a lighting device 30.

The image capture device 20 may be, for example, a video or stills camera, and exhibits an eye 32, of axis V or "sighting axis" along which the captured image enters the image capture device 20.

Preferably, the image capture device 20 is associated with a processing device 34 capable of interpreting, for example of deciphering, the image captured by the image capture device 20.

The lighting device 30 comprises a housing 36 exhibiting an entrance aperture 38 and an exit aperture 40 either of which may possibly be shuttered, for example by means of a substantially transparent glass, and preferably treated so as to limit reflections or to increase transparency. The entrance aperture 38 and exit aperture 40 are disposed substantially coaxially along the sighting axis V, the exit aperture 40 being opposite the eye 32. The space between the entrance aperture 38 and the exit aperture 40 does not exhibit any obstacle liable to impede a light beam journeying from the entrance aperture 38 to the exit aperture 40. Preferably, this space is filled with air.

The lighting device 30 further comprises a first linear polarizing filter 42 disposed in proximity to the exit aperture 40 and extending substantially parallel to the exit aperture 40 so as to mask the exit aperture 40, that is to say in such a way that substantially all the light exiting the housing 36 though the exit aperture 40 has necessarily passed through the first polarizing filter 42. The first polarizing filter 42 is therefore also oriented along the sighting axis V. It is movable in rotation about the sighting axis V.

The lighting device 30 further comprises a polarized light source 44 disposed so as to be able to emit, along an axis of incidence I, a linearly polarized incident light beam 45. Preferably, the polarized light source 44 comprises one or more light-emitting diodes of high power.

The sighting axis V and the axis of incidence I are secant at an intersection point 47 outside the lighting device 30. The angle α between the sighting axis V and the axis of incidence I is here about 40°.

The entrance aperture 38 is dimensioned in such a way that part at least of the incident light beam 45, preferably substantially the whole of this beam, can pass through it.

The reading device 10 is represented in a preferred service position in which it is able to read an engraving, in the form of a code 46, made on a convex surface S. In this position, the code 46 is disposed substantially at the intersection point 47 and extends opposite the entrance aperture 38 along a plane P substantially perpendicular to the sighting axis V. The lighting device 30 operates, however, correctly in the case of approximate positioning of the surface S.

Figure 2:
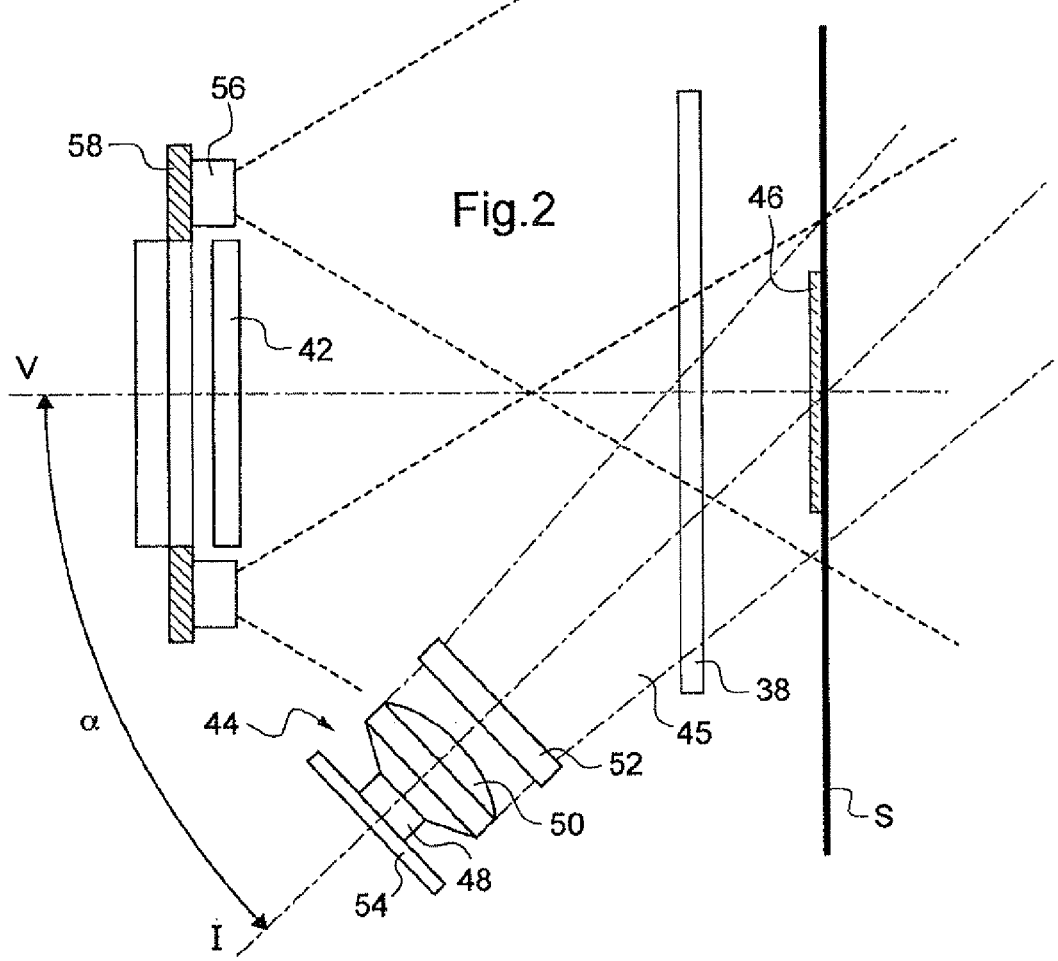
FIG. 2 represents in greater detail the lighting device, according to the invention, represented in FIG. 1, and FIGS. 3 and 4 illustrate the operation of a lighting device according to the invention for reading an engraving made on a substantially smooth surface and on an impaired surface, respectively.

The lighting device 30 is represented in greater detail in FIG. 2. In particular, the polarized light source 44 comprises a monochromatic light source 48, and then along the path of the light emitted by this source, successively a focusing optic in the form of a focusing lens 50, and a second linear polarizing filter 52.

The lighting device 30 does not comprise any obstacle between the linear polarizing filter 52 and the entrance aperture 38. Preferably, this space is filled with air.

Substantially all the light emitted by the monochromatic light source 48 is projected onto the focusing optic 50. Substantially all the light exiting the focusing optic 50 is projected onto the second polarizing filter 52. Preferably still, substantially all the light exiting the second polarizing filter 52 is projected onto the entrance aperture 38.

The monochromatic light source 48 is fixed on an electronic circuit 54.

The position of the focusing lens 50 is adjustable along the axis of incidence I so as to be able to modify the degree of focusing of the monochromatic light beam.

The lighting device 30 furthermore comprises a diffuse light source 56 in this instance in the form of light-emitting diodes disposed at the periphery of the first polarizing filter 42, for example fixed on an electronic circuit 58.

Preferably, the diffuse light source 56 is disposed so as to be able to illuminate the code 46, preferably through the entrance aperture 38. As a variant, the diffuse light source 56 could be disposed outside the housing 36. Whatever the embodiment, preferably, the diffuse light source 56 generates a light which does not pass through the first polarizing filter 42.

The entrance aperture 38 and the exit aperture 40 are dimensioned so as to allow the passage of a light beam of dimensions suited to the engraved code. The light beam can for example exhibit a width and/or a height of greater than 10 mm, preferably greater than 20 mm, or indeed greater than 25 mm. Preferably, the entrance aperture 38 and/or the exit aperture 40 exhibit a length of less than 35 mm, preferably about 30 mm and a width of less than 25 mm, preferably about 19 mm.

The lighting device 30 finally comprises a drive module 59 making it possible to modulate the lighting generated by the polarized light source and the diffuse light source.

Figure 3:
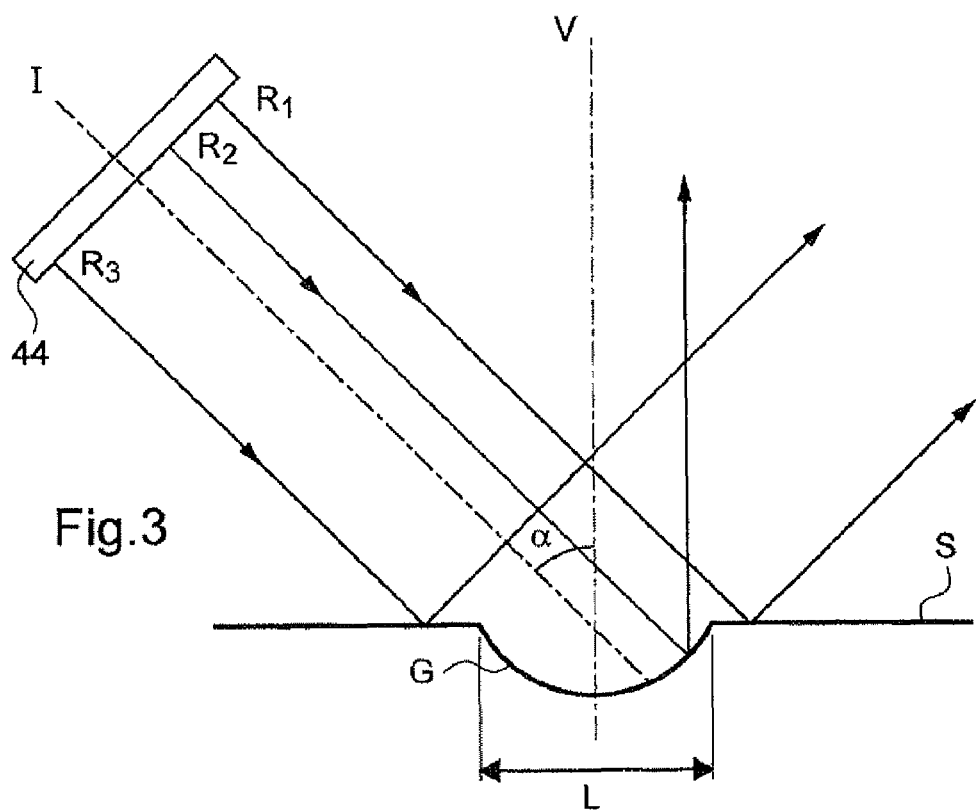
Figure 4:
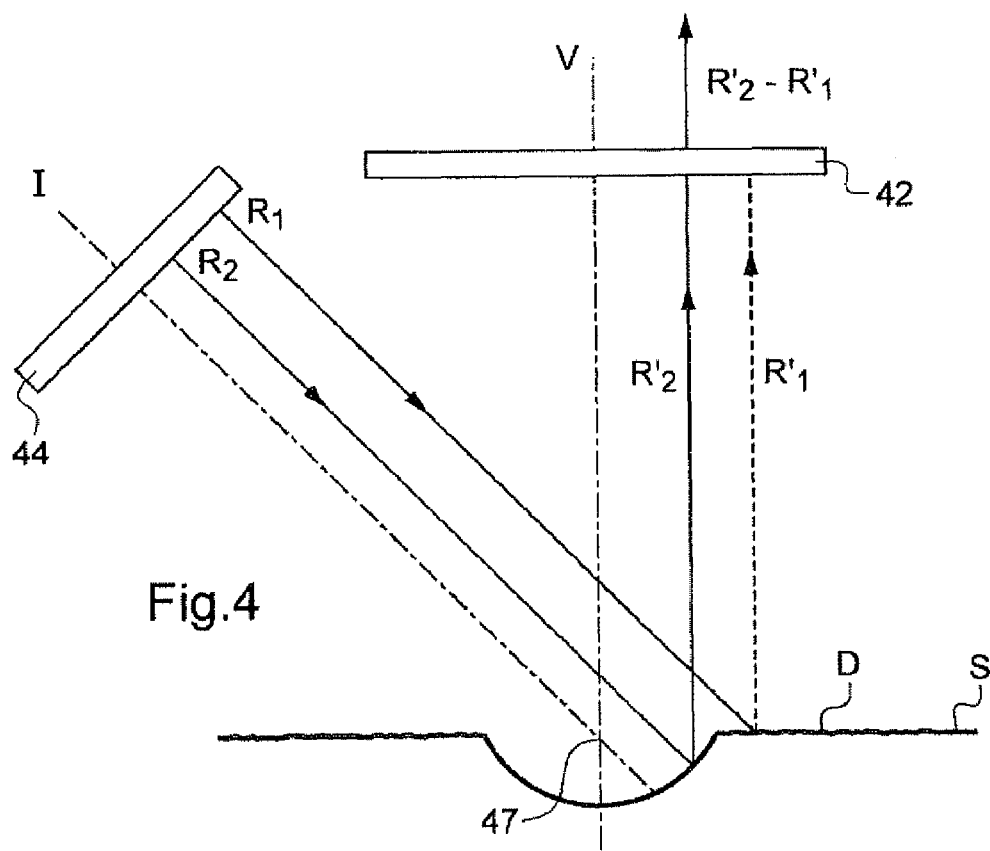

The operation of the devices represented in FIGS. 1 and 2 is now also described in regard to FIGS. 3 and 4. In FIGS. 3 and 4, an engraving dot is represented in cross-section in the form of a pit G. The length L of this pit is indicated.

The surface S is positioned in the service position, preferably substantially perpendicularly to the sighting axis V, the engraving 46 facing the entrance aperture 38. The polarized light source 44 is activated and projects, through the entrance aperture 38, focused and monochromatic polarized light onto a zone of the surface S comprising the engraving. The illumination, measured at 50 mm from the polarized light source, is, at least intermittently, greater than 100 000 lux.

More precisely, the light emitted by the monochromatic light source 48 passes successively through the focusing lens 50 and the second linear polarizing filter 52 before passing through the entrance aperture 38 and being projected onto the surface S, and in particular onto the engraving on this surface. Part of the light reflected by the surface S is returned along the sighting axis V toward the first linear polarizing filter 42, and then, after having passed through the latter, passes through the exit aperture 40 before entering, by way of the eye 32, the image capture device 20.

When the rays of the polarized light are projected onto a substantially plane surface, as represented in FIG. 3, having regard to the angle α between the sighting axis and the axis of incidence, the major part of these rays is not transmitted along the sighting axis, and does not therefore reach the image capture device (radiations $R_1$ and $R_3$).

Conversely, a significant proportion of the light reflected by the part of the pit G facing the polarized light source is reflected along the sighting axis V (radiation $R_2$). The pit G therefore appears, for the image capture device 20, as a bright dot on a dark background.

When the rays of the polarized light are projected onto an impaired or irregular surface, as represented in FIG. 4, the surface defects D also return polarized light along the sighting axis V. The first polarizing filter 42, acting as analyzer of the reflected polarized light, makes it possible to delete a portion of the specular radiation, that is to say of the radiation reflected along the sighting axis V. However, the specular radiation reflected by the defects of the irregular surface (radiation $R_1'$) is, as a surface average, much weaker than the specular radiation returned by the surface of the pit G illuminated by the polarized light (radiation $R_2'$). Thus, the irregular surface returns an image formed of a multitude of bright and dark microdots, corresponding to the various asperities, whereas the pit G returns the image of a bright spot and of a dark spot of much larger dimensions, typically 100 times, 1000 times or 10 000 times as large as said microdots.

The intensity of the radiation $R_1'$ is therefore much weaker than the intensity of the radiation $R_2'$.

The action of the first polarizing filter 42, conventionally called an "analyzer", on the reflected polarized light that it receives makes it possible to increase the contrast of the image received by the image capture device. Indeed, if "$R_2'$" denotes the quantity of light reflected by the engraving and "$R_1'$" denotes the quantity of light reflected by the defects on the surface S, with "$R_2'$" much greater than "$R_1'$", "$R_2'$" and "$R_1'$" being polarized in the same direction, it is possible, with the first polarizing filter 42, to absorb substantially the entirety of the light $R_1'$ while allowing a part, substantially equal to "$R_2'-R_1'$", of the light reflected by the cavities of the dots of the engraving to pass through the first polarizing filter 42. Stated otherwise, the radiation $R_1'$ is filtered by the first polarizing filter 42 whereas a significant part of the radiation $R_2'$ succeeds in passing through the first polarizing filter 42 and in entering the eye 32 of the image capture device 20.

Advantageously, the surface defects, rendered invisible, do not therefore disturb the reading of the engraving. The contrast of the image of the engraving is thus advantageously improved.

If appropriate, to further improve the effectiveness of the lighting device, the first polarizing filter 42 may be rotated about the sighting axis V.

It is also noted that the lighting device according to the invention may be effective even if the sighting axis V and the axis of incidence I are not secant and even if the surface S is not disposed precisely with respect to the lighting device, and in particular if it is not disposed exactly perpendicularly to the sighting axis V.

As is now clearly apparent, a lighting device according to the invention makes it possible to increase the contrast of an image of an engraving, whether this engraving is carried out on a shiny or matt surface and even when this engraving comprises dots of very small diameter and, in particular, dots engraved by micropercussion or by laser. A lighting device according to the invention is also effective for reading engravings carried out on surfaces which are not plane.

Moreover, a lighting device according to the invention may advantageously be autonomous, and rendered compatible with the reading and/or deciphering devices currently on the market.

Moreover, a lighting device according to the invention requires only a very limited number of constituents and can therefore advantageously be rendered very compact. Its integration into a reading and/or deciphering device is thereby facilitated. For the same reason, the manufacture of a lighting device according to the invention may be very economical.

Finally, a lighting device according to the invention can operate without it being indispensable to precisely position the engraving with respect to the lighting device. Advantageously, a lighting device according to the invention, or indeed a reading device according to the invention, may be rendered autonomous and/or portable.

The reading device can also be used to read structures other than engravings, such as those defined hereinbelow.

2) "Improved" Invention

The subsequent description relates mainly to a so-called "improved" invention. Unless stated otherwise, the whole of the description which follows relates to the "improved" invention.

"Improved" Lighting Device

The invention proposes a lighting device intended to increase the contrast of an image of a structure made sunken or in relief on a surface, in particular an image of a dot engraving, said device comprising:
  a first light source, disposed so as to emit, along a first axis of incidence $I_1$, a first light, preferably linearly polarized, the width of the passband of said first light, or "first passband", being less than 100 nm, preferably less than 60 nm, preferably still less than 40 nm, preferably less than 20 nm,
  a second light source disposed so as to emit, along a second axis of incidence $I_2$, a second light, preferably linearly polarized, the width of the passband of said second light, or "second passband", being less than 100 nm, preferably less than 60 nm, preferably less than 40 nm, preferably less than 20 nm,
  a third light source disposed so as to emit, along a third axis of incidence $I_3$, a third light, preferably diffuse, the width of the passband of the third light, or "third passband", being less than 100 nm, preferably less than 60 nm, preferably still less than 40 nm, preferably less than 20 nm,
the first, second and third axes of incidence being substantially concurrent and the passbands of the first, second and third lights being mutually separated, that is to say not overlapping, even partially.

As will be seen in greater detail in the subsequent description, an improved lighting device such as this allows fast adaptation of the illumination of the structure to the nature and/or to the form of the surface carrying the structure so as to optimize the contrast of the image.

The width of a passband is defined as the spectral width measured at 50% of the maximum intensity spike, that is to say corresponds to the width $(\lambda_2 - \lambda_1)$ comprising all the wavelengths extending on each side of the maximum intensity spike (corresponding to the wavelength $\lambda_{max}$) and for which the luminous intensity is greater than 50% of the maximum intensity ($P_{max}$), as represented in FIG. 6.

Preferably, the passband of at least one of the first, second and third light sources, preferably of each of said first, second and third light sources, exhibits a width of less than 20 nm.

Preferably,
  the first passband is at least in part, preferably totally, included in the band 620-645 nm (the first light is then a red light) and/or
  the second passband is at least in part, preferably totally, included in the band 460-490 nm (the second light is then a blue light), and/or
  the third passband is at least in part, preferably totally, included in the band 520-550 nm (the third light is then a green light).

The term "substantially concurrent" is understood to mean that the minimum distance between any two of the axes considered is less than 10 mm, preferably less than 5 mm, preferably less than 2 mm. Preferably, said axes are concurrent.

The luminous power emitted by the first light source may be greater than 35, greater than 45, or indeed greater than 60 lumens per Watt. This power may be obtained by means of one or more light-emitting diodes. To improve the homogeneity of the lighting and simplify the focusing optic, this power is preferably obtained by means of a single light-emitting diode.

The luminous power emitted by the second light source may be greater than 10, greater than 12, or indeed greater than 15 lumens per Watt. This power may be obtained by means of one or more light-emitting diodes. To improve the homogeneity of the lighting and simplify the focusing optic, this power is preferably obtained by means of a single light-emitting diode.

With a single diode, the inventors have noted an intensity of greater than 90% of the maximum intensity on a square zone of 100 mm² at about 50 mm from the light source.

The luminous power emitted by the third light source may be greater than 480, greater than 600, or indeed greater than 720 lumens per Watt.

In one embodiment, the third luminous source comprises more than 8, more than 10 and/or fewer than 16, fewer than 14 light-emitting diodes disposed along a circle, all oriented parallel to one another, preferably along the axis of said circle, preferably distributed equi-angularly around said circle.

Preferably, all the powers of the light-emitting diodes of the third luminous source are identical. Preferably, each of the light-emitting diodes of the third luminous source exhibits a luminous power of greater than 40, greater than 50, or indeed greater than 60 lumens per Watt.

The high powers of the light sources advantageously make it possible to saturate the image so as to limit the effects of the ambient lighting. They also make it possible to compensate for the luminous absorption, in particular that which would result from passing through polarizing filters in quadrature.

In one embodiment,
the aperture $\beta_1$ of the first light source and/or the aperture $\beta_2$ of the second light source is greater than 20°, greater than 24° and/or less than 40°, less than 36°, an aperture of about 30° being preferred overall; and/or
the aperture $\beta_3$ of the third light source is greater than 100°, greater than 120°, greater than 130° and/or less than 160°, less than 150°, less than 146°, an aperture of about 140° being preferred overall.

An "aperture" is equal to the vertex angle of the light cone emitted by the light source considered and delimited by a surface corresponding to a luminous intensity equal to 50% of the maximum luminous intensity.

Preferably, the first and second light sources emit a polarized light, preferably in a direction of polarization that cannot be modified.

Preferably, the third light source emits a diffuse light. For this purpose, it preferably comprises a diffusing block, for example of polycarbonate, the transmission coefficient of the diffusing block possibly being greater than 40%, greater than 45% and/or less than 60%, a transmission coefficient of about 50% being preferred.

In one embodiment, at any instant, at most one light source out of the first, second and third light sources may be turned on.

In one embodiment, the luminous power of each of the first, second and third light sources may be modified.

In one embodiment, only the luminous power of the first light source may be modified.

An improved lighting device according to the invention can comprise an "improved" drive module, which may be identical to or different from the drive module described hereinabove for a basic lighting device, and vice versa.

The "improved" drive module may be programmed so as to be able to vary
the light source or sources that is or are turned on, and/or
the power emitted by a light source that is turned on, and/or
the direction of the angle of incidence of a light source that is turned on, and/or
the aperture of a light source that is turned on, and/or
if appropriate, the direction of a polarization of a light emitted by a light source that is turned on.

The "improved" drive module may be programmed so as to be able to vary only
the light source or sources that is or are turned on, and/or
the power emitted by a light source that is turned on.

In one embodiment, the "improved" drive module is programmed in such a way that, at any instant, at most one light source out of the first, second and third light sources is turned on.

In one embodiment, the "improved" drive module is programmed so as to be able to selectively polarize or not polarize the light emitted by a light source.

In one embodiment, the "improved" drive module is programmed to vary the luminous power of only the first light source.

In one embodiment,
the first light source comprises a single light-emitting diode, the electrical supply voltage of said diode lies between 3 V and 4.2 V, preferably about 3.5 V, and the electrical supply current is greater than 200 mA, greater than 250 mA and/or less than 800 mA, less than 700 mA, a variable current, varying between 350 and 700 mA being preferred overall; and/or
the second light source comprises a single light-emitting diode, the electrical supply voltage of said diode lies between 3 V and 4.2 V, preferably about 3.5 V, and the electrical supply current is greater than 600 mA, greater than 650 mA and/or less than 800 mA, less than 750 mA, current of about 700 mA being preferred overall; and/or
the third light source comprises a plurality of light-emitting diodes, the electrical supply voltage of each diode lies between 3 V and 4.2 V, preferably about 3.5 V, and the electrical supply current of each diode is greater than 15 mA, greater than 20 mA, and/or less than 50 mA, less than 45 mA, a current of about 30 mA being preferred overall.

"Improved" Reading Device

The invention also relates to a device for reading a structure made on a surface, said device comprising an image capture device and an "improved" lighting device according to the invention. Such a device is called an "improved reading device", by comparison with the "basic" reading device described hereinabove.

The first and/or second axis of incidence, preferably the first and second axes of incidence, form with the optical axis of the image capture device first and second angles $\alpha_1$ and $\alpha_2$ of greater than 45° and/or less than 65°. The optical axis of an image capture device is conventionally the axis of the objective, generally a convergent lens, by which the light rays destined for a sensor, conventionally a CCD or CMOS sensor, enter this device.

In one embodiment, the first and second axes of incidence and said optical axis are coplanar. In particular, the angles $\alpha_1$ and $\alpha_2$ may be identical. In this plane, the first and second axes of incidence may be symmetric with respect to said optical axis.

The third axis of incidence and the optical axis can form between them an angle $\alpha_3$ of less than 10°, less than 5°, or indeed substantially zero.

In one embodiment, the first, second and third axes of incidence and said optical axis are coplanar.

In one embodiment, the third light source consists of a luminous annulus. Advantageously, the reading window of the image capture device may be placed, along the optical axis, substantially in the middle of this luminous annulus.

Preferably, the improved reading device comprises a first linear polarizing filter, oriented along a sighting axis V coinciding with the optical axis of the image capture device. In one embodiment, the direction of polarization of this first polarizing filter is non-modifiable.

Preferably, this first polarizing filter is in quadrature with at least one, preferably with both second polarizing filters ensuring, preferably, the polarization of the first and/or second lights. This placement in quadrature implies that a large part of the polarized light emitted by the first and/or second light source is filtered by the succession of a second polarizing filter and of said first polarizing filter.

In a preferred embodiment, the direction of polarization of the first and/or second light source and the direction of polarization imposed by the first polarizing filter are fixed, that is to say cannot be modified.

The "improved" first linear polarizing filter may be placed in front of the reading window of the image capture device.

Preferably, the light emitted by the third light source is not polarized at least until reaching said surface. After reflection on said surface, it can pass through said first polarizing filter before reaching the image capture device.

Preferably, the third luminous source exhibits the form of a luminous annulus, the reading window of the image capture device being disposed in the virtual cylinder extending along the axis of said annulus and of the same diameter as said annulus.

The light sources may have variable angle of incidence and/or variable aperture.

Preferably, all the items constituting an "improved" lighting device according to the invention are fixed, including the elements ensuring a light polarization.

In one embodiment, the lighting device does not comprise any mirror.

In one embodiment, the trajectory of the light from at least one of the first, second and third light sources, preferably from any one of these light sources, up to said surface S, and then from this surface up to the image capture device is direct, that is to say is not deviated by a mirror.

In one embodiment, the "improved" reading device comprises an "improved" drive module programmed so as to
 a) modify the reading device in accordance with a plurality of configurations, in particular by
  turning on successively, in any order, one or more of the first, second and third light sources; and/or
  varying, for a light source, the angle of incidence and/or the aperture and/or the power of this light source; and/or
  polarizing or not polarizing the light emitted by a light source, and, optionally, modifying the direction of possible polarization of said light;
 b) evaluate the quality of the contrast of the image read by the image capture device for each of said configurations and determine an optimal configuration;
 c) configure the reading device in accordance with the optimal configuration.

The quality of the contrast may be evaluated by any known scheme. A high contrast corresponds to a sharper "differentiation" of a dot with respect to the neighboring dots, In one embodiment, the improved reading device comprises an "improved" drive module programmed so as to
 a) modify the reading device in accordance with a plurality of configurations, in particular by
  turning on successively, in any order, the first light source, the second light source and the third light source; and/or
  varying the power of the first light source when it is turned on;
 b) evaluate the quality of the contrast of the image read by the image capture device for each of said configurations and determine an optimal configuration;
 c) configure the reading device in accordance with the optimal configuration.

A lighting device according to the improved invention, or indeed a reading device according to the improved invention, may be rendered autonomous and/or portable.

"Improved" Method

The invention further relates to an "improved" or "basic" method for improving the contrast of an image of a structure produced on a surface, in which method said structure is read by means of an "improved" or "basic" reading device according to the invention.

The surface carrying the structure may be metallic or nonmetallic, in particular stainless steel, titanium, aluminum, gold or silver. It may in particular be convex, concave, of matt or shiny appearance, gold-plated, silver-plated, or painted, smooth or rough.

The structure can comprise a plurality of dots, for example of a diameter of less than 1 mm, less than 0.5 mm, or indeed less than 0.2 mm.

The dots may be produced sunken, for example by engraving, in particular by means of a laser or by micropercussion. These dots may also be produced in relief, through microbumps, obtained by deformation or cold-hammering. The structure can in particular be an engraving such as described hereinabove. Finally, the dots may be neither sunken, nor in relief and result from a local modification of the material of the surface, for example an oxidation or a crystallographic phase change.

In one embodiment, the structure is not printed (like the barcodes conventionally printed on packaging). Indeed, although it is conceivable to use a device according to the invention to read a printed structure, a device according to the invention is designed for reading structures that are more difficult to read.

As represented in FIG. 7 (representing an exemplary two-dimensional code), some dots may be distinct, like the dots $p_1$ and $p_2$, or be adjacent, like the dots $p_3$ and $p_4$.

The largest dimension of the structure can in particular be less than 10 mm, less than 5 mm, or indeed less than 4 mm. The structure can comprise more than 50, more than 60, or indeed more than 70 dots. Typically, the structure can exhibit the form of a code 3 mm×3 mm comprising about 80 dots. A reading device according to the invention has indeed proved to be particularly efficacious for reading codes of very small dimensions.

An "improved" method can in particular be used to improve the contrast of an image of a structure produced on a metallic surface, for example stainless steel, titanium, aluminum, gold or silver and/or a shiny surface, and in particular a surface whose arithmetic roughness $R_a$ is less than 0.1 µm.

Preferably, the first light source, and only the first light source, is used, preferably with interposition of a first and of a second polarizing filters in quadrature as described hereinabove, to read a structure obtained by micropercussion and/or carried by a cambered and/or shiny surface.

Preferably, the second light source, and only the second light source, is used, preferably with interposition of a first and of a second polarizing filters in quadrature as described hereinabove, to read a structure, in particular a structure in relief, in particular obtained by deformation or cold-hammering, carried by a matt metallic surface, that is to say one exhibiting an arithmetic roughness Ra of greater than 0.1 µm, and/or carried by a plane surface.

Preferably, the third light source, and only the third light source, is used to read a structure obtained by reaction (in particular oxidation or change of crystallographic structure), for example by surface tempering or annealing, or by means of a laser, on a metallic material. Surprisingly, lighting such a structure by means of a nonpolarized diffuse green light has proven to be particularly effective.

Advantageously, the "improved" invention allows effective reading of structures made on surfaces exhibiting very diverse natures, forms, or surface states.

The invention thus relates further to a method for reading structures, for example engravings, carried by a plurality of surfaces exhibiting different natures and/or forms and/or surface states, in which method said structures are read by means of one and the same "basic" or "improved" reading device according to the invention.

The plurality of surfaces can in particular comprise at least two surfaces
 of different forms, for example a plane surface and a non-plane surface; and/or of different natures, for example a metallic surface and a non-metallic surface; and/or exhibiting different surface states, for example different roughnesses.

Other characteristics and advantages of the improved invention will be further apparent on reading the detailed description which follows and on examining the appended drawing in which:

the appended FIG. 5 which schematically represents an "improved" reading device according to the invention, in a service position in which said device performs a reading of an engraving. The embodiment described in detail hereinbelow and represented in FIG. 5 is provided for illustrative and nonlimiting purposes;

FIG. 6 an example of a luminous spectrum;

FIG. 7 represents an exemplary two-dimensional code that may be read with a basic or improved reading device according to the invention.

In FIG. 5, identical references have been used to denote items identical or analogous to those of the "basic" invention. These items are therefore not described again in detail. The items of the first and second light sources being similar to those of the polarized light source 44 described hereinabove, the same references, assigned an index "1" and "2", have been used.

FIG. 5 represents an exemplary "improved" lighting device. This device comprises first and second light sources, referenced respectively $44_1$ and $44_2$, emitting a polarized red light and a polarized blue light, along axes of incidence $I_1$ and $I_2$ respectively, forming angles $\alpha_1$ and $\alpha_2$, respectively, of about 55° with a sighting axis V.

The first light source consists of light-emitting diodes. It is supplied with three levels of electric current: 350, 500 and 700 mA.

The second light source consists of light-emitting diodes. It is supplied with a single level of electric current: 700 mA.

The device further comprises a third light source 56, emitting a diffuse green light along an axis of incidence $I_3$ coincident with the sighting axis V.

The third light source 56 consists of twelve identical light-emitting diodes equiangularly distributed around a circle of axis $I_3$. The third light source 56 thus forms a luminous annulus. The luminous power of each light-emitting diode is greater than 60 lumens per Watt.

Each light-emitting diode of the third light source is supplied with a single electric current level: 30 mA.

The passband of the first light source is 620-645 nm. The aperture $\beta_1$ of the first light source is about 30°.

The passband of the second light source is 460-490 nm. The aperture $\beta_2$ of the second light source is about 30°.

The passband of the third light source is 520-550 nm. The aperture $\beta_3$ of the third light source is about 140°.

The luminous power of the first light source is greater than 35 lumens per Watt.

The luminous power of the second light source is greater than 10 lumens per Watt.

The luminous power of the third light source is greater than 480 lumens per Watt.

The three axes of incidence $I_1$, $I_2$, and $I_3$ are coplanar and concurrent at a point C substantially at the center of the reading zone.

Generally, the distance between the point C and the first light source $44_1$, "$1_1$", and/or the distance between the point C and the second light source $44_2$, "$1_2$", and/or the distance between the point C and the first polarizing filter 42, "1", is preferably less than 80 mm, less than 70 mm, less than 60 mm, less than 50 mm. Preferably each of these distances is less than 80 mm, less than 70 mm, less than 60 mm, less than 50 mm.

A first polarizing filter 42, whose axis is the sighting axis V, is disposed in the middle of the luminous annulus constituted by the third light source. This first polarizing filter 42 ensures a linear polarization in quadrature with that of the second polarizing filters $52_1$ and $52_2$ which are ensuring the linear polarization of the light emitted by the first and second light sources, respectively. The directions of polarization of these various filters are fixed.

The sighting axis V, coincident with the axis of incidence $I_3$, is the optical axis of an image capture device, for example of a camera, not represented. The image capture device therefore receives light emitted by the light sources, reflected by the surface S, and having passed through the first polarizing filter 42, including when the light is a diffuse light originating from the third light source.

To improve the contrast of an image of a structure, for example of an engraving 46, this structure is presented in front of the entrance aperture 38. The first light source, red, is turned on and the power is varied so as to seek the maximum contrast.

The first light source is then turned off and the second light source, blue, is turned on, while also measuring the contrast.

The second light source is then turned off, after which the third light source, green, is turned on and the contrast is measured once again.

The contrast measurements are then compared, the configuration offering a maximum contrast is applied, and then the image of the structure is captured and is interpreted.

A drive module, not represented, can ensure this operation.

Of course, the "improved" invention is not limited to the embodiments described and represented hereinabove, provided by way of illustrative and nonlimiting examples.

In particular, the polarization of the light emitted by the first light source and/or the second light source is preferred, but nonlimiting.

An "improved" lighting device and an "improved" reading device can comprise one or more of the characteristics of a "basic" lighting device and of a "basic" reading device, unless such characteristics are incompatible.

In particular, the image capture device of an "improved" reading device may be identical to or different from that described within the framework of the "basic" reading device.

The first polarizing filter of an "improved" lighting device may be identical to the first polarizing filter of a "basic" lighting device.

The first polarized light source and/or the second light source, and the first linear polarizing filter can constitute a "basic" lighting device. The third light source can constitute a diffuse light source of such a "basic" lighting device.

Conversely, a "basic" lighting device and a "basic" reading device can comprise one or more of the characteristics of an "improved" lighting device and of an "improved" reading device, unless such characteristics are incompatible.

In particular, the "improved" drive module may be used for the "basic" invention.

The invention claimed is:

1. A reading device for reading a structure made on a surface, said reading device comprising:
   an image capture device exhibiting an optical axis;
   a lighting device intended to increase the contrast of an image of a structure made on a surface, said lighting device comprising:

a first light source, disposed so as to emit, along a first axis of incidence, a first light, the width of the passband of said first light, or "first passband," being less than 100 nm, a second light source disposed so as to emit, along a second axis of incidence, a second light, the width of the passband of said second light, or "second passband," being less than 100 nm, a third light source disposed so as to emit, along a third axis of incidence, a third light, the width of the passband of the third light, or "third passband," being less than 100 nm, the first, second and third axes of incidence being substantially concurrent and the passbands of the first, second and third lights being mutually separated, the first and/or second axis of incidence forming, with said optical axis, first and second angles greater than 45° and less than 65°, and/or the third axis of incidence being coincident with said optical axis; and a first linear polarizing filter oriented along said optical axis and in quadrature with second polarizing filters ensuring a linear polarization of the first and second lights.

2. The reading device as claimed in claim 1, in which the third light source consists of a luminous annulus whose axis coincides with said optical axis.

3. The reading device as claimed in claim 1, comprising a drive module programmed so as to
a) modify the reading device in accordance with a plurality of configurations,
b) evaluate the quality of the contrast of the image read by the image capture device for each of said configurations and determine an optimal configuration;
c) configure the reading device in accordance with the optimal configuration.

4. A method for reading structures comprising a plurality of dots of a diameter less than 1 mm, which structures are carried by a plurality of surfaces exhibiting different natures and/or forms and/or surface states, in which method said structures are read by means of one and the same reading device as claimed in claim 1.

5. The method as claimed in claim 4, according to which
the first light source alone is used to read a structure obtained by micropercussion and/or carried by a cambered surface and/or exhibiting an arithmetic roughness Ra of less than 0.1 µm, and/or
the second light source alone is used to read a structure in relief carried by a metallic surface exhibiting an arithmetic roughness Ra of greater than 0.1 µm and/or carried by a plane surface, and/or
the third light source alone is used to read a structure obtained by reaction or by means of a laser, on a metallic material.

6. The reading device as claimed in claim 1, in which the width of at least one of the first, second and third passbands is less than 20 nm.

7. The reading device as claimed in claim 6, in which the width of each of the first, second and third passbands is less than 20 nm.

8. The reading device as claimed in claim 1, in which
the first light is linearly polarized, and/or
the second light is linearly polarized, and/or
the third light is diffuse.

9. The reading device as claimed in claim 1, in which
the first passband is at least in part included in the band 620-645 nm, and/or
the second passband is at least in part included in the band 460-490 nm, and/or
the third passband is at least in part included in the band 520-550 nm.

10. The reading device as claimed in claim 1, in which
the luminous power emitted by the first light source is greater than 35 lumens per Watt, and/or
the luminous power emitted by the second light source is greater than 10 lumens per Watt, and/or
the luminous power emitted by the third light source is greater than 480 lumens per Watt.

11. The reading device as claimed in claim 1, in which
the aperture of the first light source and/or the aperture of the second light source is greater than 25° and less than 45°; and/or
the aperture of the third light source is greater than 100° and less than 140°, wherein an "aperture" is equal to the vertex angle of the light cone emitted by the light source considered and delimited by a surface corresponding to a luminous intensity equal to 50% of the maximum luminous intensity.

12. The reading device as claimed in claim 1, comprising a drive module programmed so as to be able to vary
the light source or sources that is or are turned on, and/or
the power emitted by a light source that is turned on, and/or
the direction of the angle of incidence of a light source that is turned on, and/or
the aperture of a light source that is turned on, and/or
if appropriate, the direction of a polarization of a light emitted by a light source that is turned on, and/or
to be able to selectively polarize or not polarize the light emitted by a light source.

13. The reading device as claimed in claim 1, in which, at any instant, at most one light source out of the first, second and third light sources may be turned on and/or in which only the luminous power of the first light source may be modified.

* * * * *